(12) United States Patent
Kanagawa

(10) Patent No.: US 9,991,026 B2
(45) Date of Patent: *Jun. 5, 2018

(54) CONDUCTIVE CABLE, METHOD FOR PRODUCING THE SAME, AND WIRING STRUCTURE FOR THE SAME

(71) Applicant: SUMITOMO WIRING SYSTEMS, LTD., Yokkaichi, Mie (JP)

(72) Inventor: Shuuichi Kanagawa, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/899,407

(22) PCT Filed: Jul. 1, 2014

(86) PCT No.: PCT/JP2014/067503
§ 371 (c)(1),
(2) Date: Dec. 17, 2015

(87) PCT Pub. No.: WO2015/002180
PCT Pub. Date: Jan. 8, 2015

(65) Prior Publication Data
US 2016/0148720 A1    May 26, 2016

(30) Foreign Application Priority Data

Jul. 4, 2013  (JP) ................. 2013-140918

(51) Int. Cl.
*H01R 4/20*  (2006.01)
*H01B 7/04*  (2006.01)
(Continued)

(52) U.S. Cl.
CPC ............. *H01B 7/04* (2013.01); *B60L 11/14* (2013.01); *B60L 11/1877* (2013.01);
(Continued)

(58) Field of Classification Search
CPC ....................................................... H01R 4/20
(Continued)

(56) References Cited

U.S. PATENT DOCUMENTS 3,956,823 A * 5/1976 Kuo ................. H01R 4/20
                                                    174/94 R
5,960,540 A * 10/1999 Pentz ............... H01R 13/025
                                                    29/33 M
(Continued)

FOREIGN PATENT DOCUMENTS

FR    2918808    * 4/2012
JP    2011-173456 A    9/2011
(Continued)

OTHER PUBLICATIONS

Sep. 22, 2014 International Search Report issued in International Patent Application No. PCT/JP2014/067503.

*Primary Examiner* — Chau N Nguyen
(74) *Attorney, Agent, or Firm* — Oliff PLC

(57) ABSTRACT

A conductive cable includes a single-core electric cable and a stranded electric cable. The single-core electric cable is constituted by a single conductor covered with a coating. The stranded electric cable is constituted by a plurality of stranded wires that are covered with a coating. The stranded electric cable is electrically connected to at least one of two end portions in a length direction of the single-core electric cable. The coating is stripped and the conductor is exposed at the at least one end portion of the single-core electric cable, the exposed conductor being crushed to one side in a thickness direction into a flat plate shape to form a crushed portion, and the wires of the stranded electric cable being connected to the crushed portion.

11 Claims, 6 Drawing Sheets

(51) Int. Cl.

| | |
|---|---|
| *B60L 11/14* | (2006.01) |
| *B60L 11/18* | (2006.01) |
| *H01R 4/72* | (2006.01) |
| *H01B 7/00* | (2006.01) |
| *H01B 13/00* | (2006.01) |
| *H02G 1/14* | (2006.01) |

(52) U.S. Cl.
CPC ....... *H01B 7/0009* (2013.01); *H01B 13/0036* (2013.01); *H01R 4/726* (2013.01); *B60L 2240/36* (2013.01); *H01R 2201/26* (2013.01); *H02G 1/14* (2013.01); *Y02T 10/70* (2013.01); *Y02T 10/7005* (2013.01); *Y02T 10/705* (2013.01); *Y02T 10/7077* (2013.01)

(58) Field of Classification Search
USPC .............................................. 174/84 C, 88 R
See application file for complete search history.

(56) References Cited

U.S. PATENT DOCUMENTS

| | | | |
|---|---|---|---|
| 7,180,040 B2* | 2/2007 | Jones | H05B 3/56 174/84 C |
| 8,667,676 B2* | 3/2014 | Sviben | H01R 4/726 174/84 C |
| 9,666,955 B2* | 5/2017 | Sugino | H02G 15/1806 |
| 2006/0121773 A1* | 6/2006 | Ichikawa | H01R 4/70 439/408 |
| 2014/0110459 A1 | 4/2014 | Kataoka | |
| 2014/0203068 A1 | 7/2014 | Hino | |

FOREIGN PATENT DOCUMENTS

| | | |
|---|---|---|
| JP | 2013-025997 A | 2/2013 |
| JP | 2013-069623 A | 4/2013 |
| WO | 2011/102005 A1 | 8/2011 |
| WO | WO 2013/012095 * | 1/2013 |

* cited by examiner

CONDUCTIVE CABLE, METHOD FOR PRODUCING THE SAME, AND WIRING STRUCTURE FOR THE SAME

This application is a national stage application of PCT/JP2014/067503, international filing date Jul. 1, 2014, and claims priority to JP 2013-140918, filed in Japan on Jul. 4, 2013, the entire disclosures of which are hereby incorporated by reference in their entirety.

BACKGROUND

The present invention relates to a conductive cable, a method for producing the same, and a wiring structure for the same.

In hybrid vehicles or electric vehicles, a battery and a motor (inverter) are connected to each other using a conductive cable. The conductive cable wiring structure described in JP 2011-173456A is known as such a conductive cable wiring structure. In the wiring structure disclosed in JP 2011-173456A, a battery provided on the rear side of an automobile and an inverter provided in an engine room are connected to each other using three electric cables. A metal shield pipe is disposed underneath the floor of the automobile, and the conductive cables are inserted into this shield pipe. The shield pipe is bent into a shape that follows a predetermined wiring path, and the front end is introduced into the engine room and extends to the vicinity of the inverter. Since the wiring path between the shield pipe and the inverter is relatively short and the connection task becomes difficult if the shield pipe cannot be freely bent, a metal braided portion that is made up of individual metal wires braided into a tubular shape is connected to the front end of the shield pipe so that bending can be easily performed. Similarly, the conductive cables inside the metal braided portion are also required to follow the bending of the metal braided portion, and therefore, stranded electric cables that have superior bendability have been commonly used in the entire wiring path as the conductive cables for connecting the battery and the motor (inverter).

SUMMARY

The diameter of the shield pipe depends on the outer diameter of the conductive cables to be inserted into the shield pipe. However, a problem that has been pointed out is that the cost is likely to increase since it is difficult to reduce the diameter of the above-noted stranded electric cables and a process for stranding a plurality of metal wires is required.

Preferred embodiments were made based on the foregoing circumstances, and it is an object thereof to provide a conductive cable in which free bendability can be ensured at the end portion and the diameter of the required portion can be reduced, a method for producing the same, and a wiring structure for the same.

A conductive cable may be a conductive cable including a single-core electric cable constituted by a single conductor covered with a coating, and a stranded electric cable constituted by a plurality of stranded wires that are covered with a coating, wherein the stranded electric cable is electrically connected to at least one of two end portions in a length direction of the single-core electric cable, and the coating is stripped and the conductor is exposed at the end portion of the single-core electric cable, the exposed conductor being crushed to one side in a thickness direction into a flat plate shape to form a crushed portion, and the wires of the stranded electric cable being connected to the crushed portion.

A method for producing a conductive cable may be a method for producing a conductive cable including a single-core electric cable constituted by a single conductor covered with a coating, and a stranded electric cable constituted by a plurality of stranded wires that are covered with a coating, and the method may include abutting an end surface of the conductor and end surfaces of the wires against each other by inserting at least one of two end portions of the conductor in a length direction of the single-core electric cable and end portions of the wires of the stranded electric cable into a pipe, electrically connecting the conductor and the wires by welding the end surface of the conductor and the end surfaces of the wires, and breaking and removing the pipe.

A wiring structure using such a conductive cable may include a shield pipe that is to be disposed underneath a floor of a hybrid vehicle or an electric vehicle and into which the single-core electric cable is inserted, wherein the stranded electric cable is electrically connected to the single-core electric cable in a state in which at least a portion of the stranded electric cable projects from the shield pipe.

With the present disclosure, the end portion of the conductive cable is constituted by the stranded electric cable, and therefore, it is possible to ensure a favorable bendability in a section to be wired at the end portion. In addition, the section required to be wired is constituted by a single-core electric cable, and therefore, the diameter thereof can be reduced compared with the stranded electric cable, which is advantageous for wiring in a narrow space.

Furthermore, when such a conductive cable is applied to hybrid vehicles or electric vehicles, the following effect can be obtained. That is, a shield pipe disposed underneath the floor of the vehicle may be bent to a small extent into a shape that follows a predetermined wiring path, and thus a single-core electric cable that does not have so high bendability can be adequately used. As described above, it is easy to reduce the diameter of the single-core electric cable compared with the stranded electric cable. Accordingly, the single-core electric cable contributes to the reduction of the diameter of the shield pipe, thus making it possible to achieve the improvement of efficiency in an installation space and the weight reduction. Since the shield pipe makes up most of the wiring path of the conductive cable in hybrid vehicles, it is very important to use the installation space efficiently and reduce weight.

The stranded electric cable may be located in the portion outside of the shield pipe, thus making it easy to perform the connection task by freely bending the stranded electric cable.

The coating may be stripped and the conductor exposed at the end portion of the single-core electric cable, the exposed conductor may be crushed into a flat plate shape to form a crushed portion, and the wires of the stranded electric cable may be connected to the crushed portion. Therefore, the crushed portion may be easily and reliably connected to the stranded electric cable using a joining means such as ultrasonic welding, resistance welding or soldering.

The crushed portion may be crushed to one side in a thickness direction. Here, if the crushed portion is crushed to the center, a portion projecting from the crushed portion is formed on a side opposite to the side on which the wires of the stranded electric cable are stacked, of the conductor of the single-core electric cable. However, with the above-described configuration, such a projecting portion is not formed on a side opposite to the side on which the wires of the stranded electric cable are stacked, of the conductor of the single-core electric cable, and therefore, a width dimension of the connection portion can be correspondingly reduced.

In the conductive cable produced by the method for producing a conductive cable, the single-core electric cable and the stranded electric cable may be electrically connected to each other by abutting an end surface of the conductor against end surfaces of the wires and welding the conductor and the wires together. With this configuration, the width dimension of the connection portion can be reduced compared with a case where the conductor of the single-core electric cable and the wires of the stranded electric cable are stacked in the width direction and connected to each other.

BRIEF DESCRIPTION OF THE DRAWINGS

FIG. 7 shows partially enlarged cross-sectional views illustrating a connection portion where a single-core electric cable is connected to a stranded electric cable in a conductive cable according to Embodiment 4.

DETAILED DESCRIPTION OF EMBODIMENTS

Preferred embodiments will be described below.

(1) It is preferable that a conductive cable has a configuration in which a connection portion where the single-core electric cable and the stranded electric cable are connected to each other is covered with a seal member. An example of the seal member is a heat-shrinkable tube that connects the coating of the single-core electric cable with the coating of the stranded electric cable while covering the connection portion. Alternatively, the connection portion may be covered by applying a mold or hot melt thereto.

With this configuration, not only insulation but also water-stop properties are ensured by the seal member.

Next, Embodiments 1 to 4, in which a conductive cable of the present disclosure is embodied, will be described with reference to the drawings.

Embodiment 1

Figure 4:
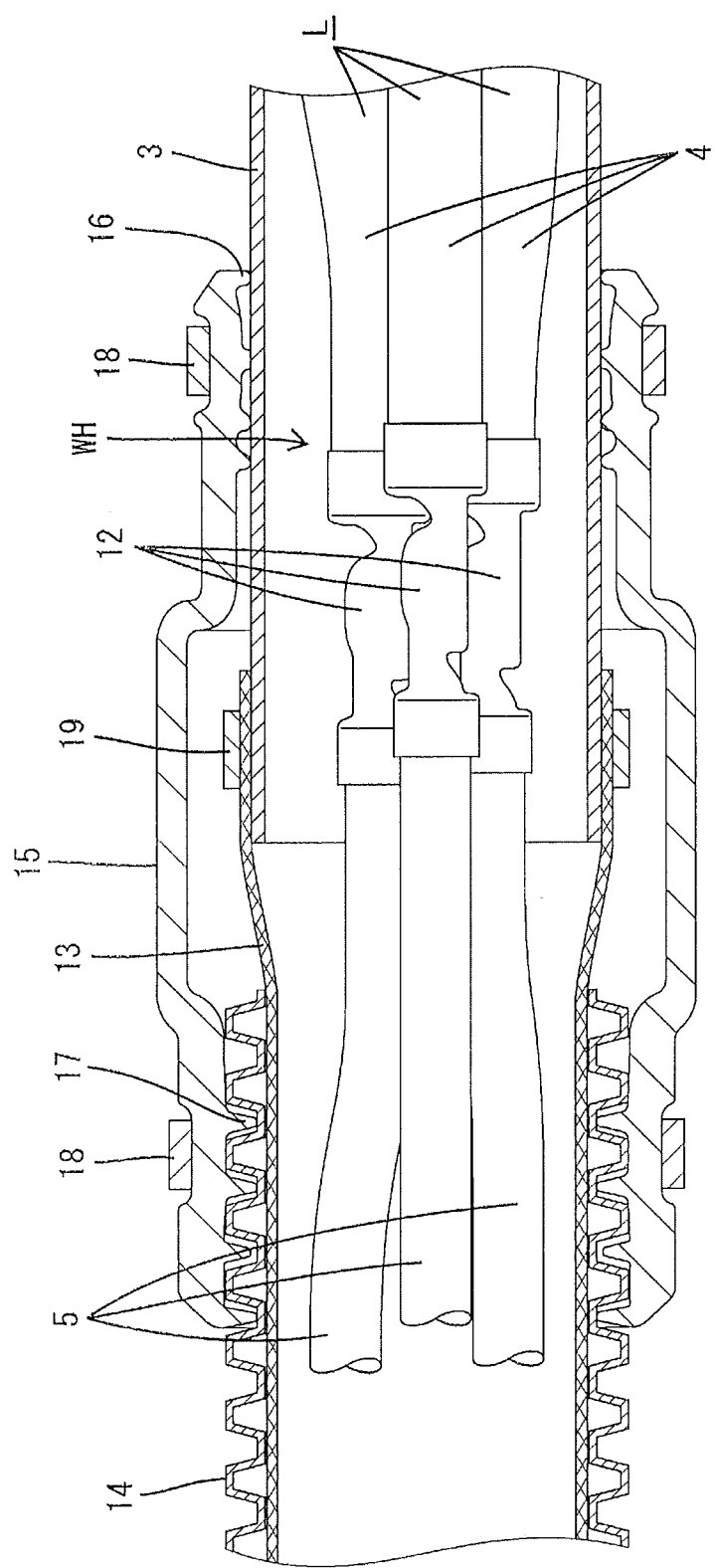
FIG. 4 is a cross-sectional view illustrating a state in which the conductive cables are inserted into a shield pipe, a metal braided portion, and a corrugated tube.

A conductive cable L of this embodiment may be applied to a hybrid vehicle. A wire harness WH may connect a battery 1 installed on a rear side of the vehicle and an inverter 2 installed inside an engine room. In this embodiment, as shown in FIG. 4, the wire harness WH is constituted by three conductive cables L.

The wire harness WH may be collectively inserted into a shield pipe 3 disposed underneath the floor of the vehicle. More specifically, the rear end of the shield pipe 3 is introduced to a rear suspension side of a compartment, and a metal braided portion 13, which will be described later, is interposed between the rear end of the shield pipe 3 and the battery 1. The middle portion of the shield pipe 3 may extend in a substantially horizontal manner in the front-rear direction underneath the floor of the vehicle. The front end thereof is bent upward and introduced into the engine room, and extends toward the inverter 2.

The shield pipe 3 may be made of, for example, aluminum or an aluminum alloy, and may be constituted by an elongated pipe having a circular cross section. The shield pipe 3 is bent into a shape that follows a predetermined piping route.

Figure 2:
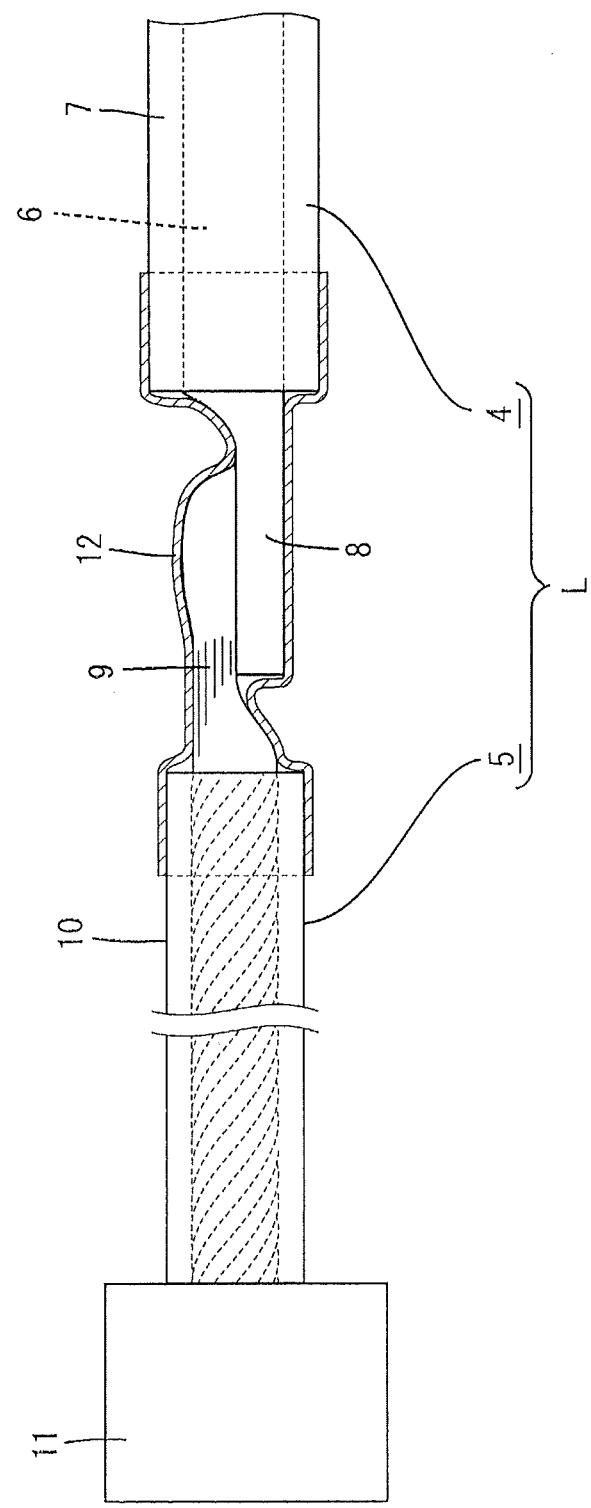
FIG. 2 is an enlarged front view illustrating the region of a connection portion where a stranded electric cable and a single-core electric cable are connected to each other in the conductive cable.
Figure 3:
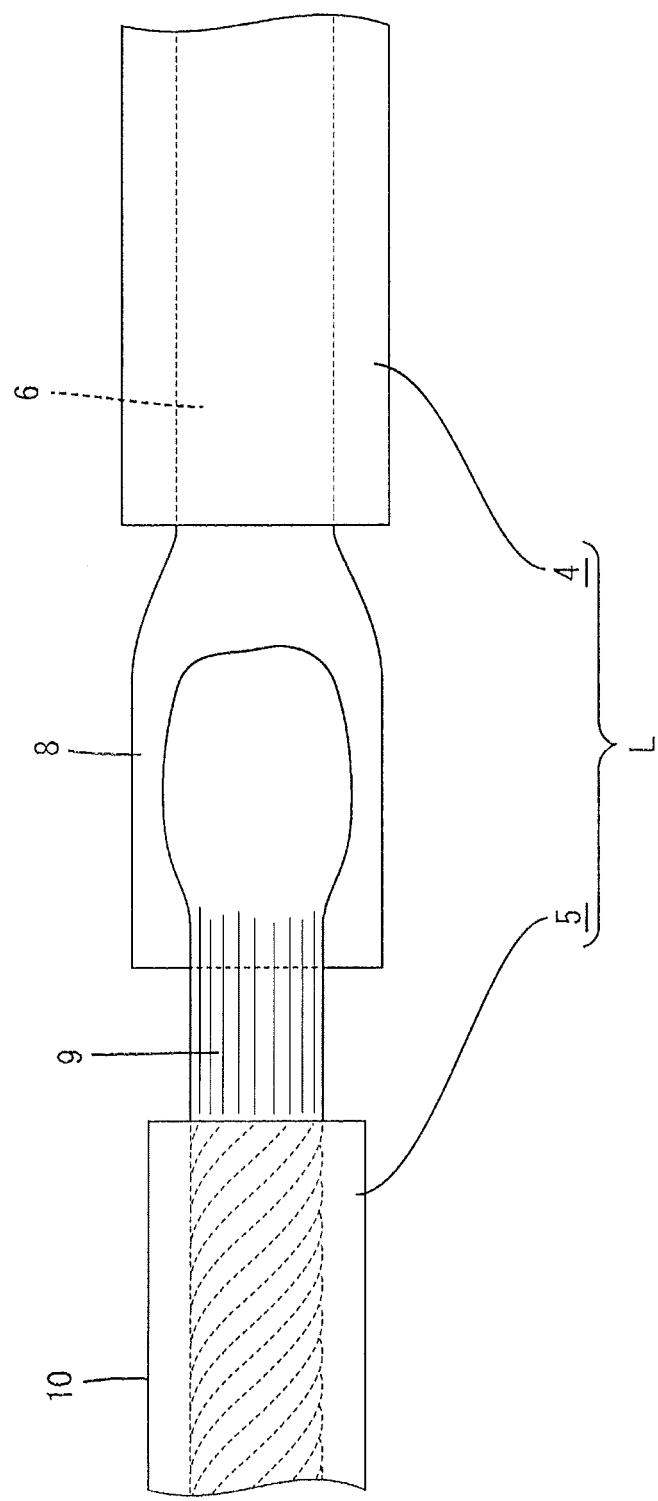
FIG. 3 is an enlarged plan view illustrating the region where the stranded electric cable and the single-core electric cable are connected to each other in the conductive cable.

As shown in FIG. 2, each conductive cable L may have a configuration in which a single-core electric cable 4 and a stranded electric cable 5 are electrically connected to each other in their length direction. The single-core electric cable 4 has a configuration in which a single conductor 6 is covered with a coating 7 that is made of an insulating material. In this embodiment, the conductor 6 may be made of, for example, copper or a copper alloy, and is formed so as to have a circular cross section. The coating 7 at the front end of each single-core electric cable 4 is stripped over a range of a predetermined length, exposing the conductor 6. As shown in FIGS. 2 and 3, the exposed conductor 6 is crushed from above into, for example, a flat plate shape to form a crushed portion 8. This crushed portion 8 is formed by being crushed to one side with respect to the center of the single-core electric cable 4 such that both the upper and lower surfaces in the crushing direction are substantially flat and the width thereof is larger than that of a neck portion (root portion exposed from the coating 7).

On the other hand, the stranded electric cable 5 may have a configuration in which a plurality of wires 9 are used as core wires and the wires 9 are covered with a coating 10 that is made of an insulating material. Each wire 9 may be made of, for example, copper or a copper alloy. The coating 10 of the stranded electric cable 5 at each of the two ends is stripped over a range of a predetermined length, exposing the wires 9. Terminal fittings (not shown) may be connected to the front ends of the exposed wires 9. When the terminal fittings (not shown) connected to the front end portions of the stranded electric cables 5 are accommodated inside a housing of a connector 11 and are fitted to a housing of a connector on the inverter 2 side, the terminal fittings are electrically connected to the inverter 2. On the other hand, the wires 9 exposed from the rear end of the stranded electric cable 5 may be joined to the crushed portion 8 of the single-core electric cable 4 using an ultrasonic joining machine. Inter-metal joining at a contact portion where the exposed end portions of the wires 9 are connected to the crushed portion 8 is performed by this ultrasonic welding, and due to this connected state, the wires 9 and the crushed portion 8 are electrically connected. As seen in FIG. 2, the coating 10 covering the stranded electric cable 5 is stripped and the stranded electric cable 5 is exposed. The exposed stranded electric cable 5 is connected to the upper surface of the crushed portion 8, and the exposed stranded electric cable 5 has an upper surface and a lower surface that is connected to the upper surface of the crushed portion 8. The lower surface of the exposed stranded electric cable 5 is disposed closer than the upper surface of the exposed stranded electric cable 5 to a center of the stranded electric cable 5 so that the lower surface of the exposed stranded electric cable 5 mates with the upper surface of the crushed portion 8.

As shown in FIG. 4, in a state in which the conductive cables L are inserted into the shield pipe 3, the connection portions between the single-core electric cables 4 and the stranded electric cable 5 are positioned near the end portion of the shield pipe 3 and inside the shield pipe 3. Moreover, as shown in FIG. 2, the connection portion where the single-core electric cable 4 is connected to the stranded electric cable 5 is covered with a heat-shrinkable tube or hot melt (seal member) 12. Each conductive cable L is inserted into the heat-shrinkable tube or hot melt 12 in a state in which the heat-shrinkable tube or hot melt 12 spans the region between the coating 7 of the single-core electric cable 4 and the coating 10 of the stranded electric cable 5, and thus the insulation between the conductive cables L is maintained. Moreover, the heat-shrinkable tube or hot melt 12 is in intimate contact with the outer circumferential surfaces of the coating 7 of the single-core electric cable 4 and the coating 10 of the stranded electric cable 5, and thus the sealed state is maintained.

Figure 1:
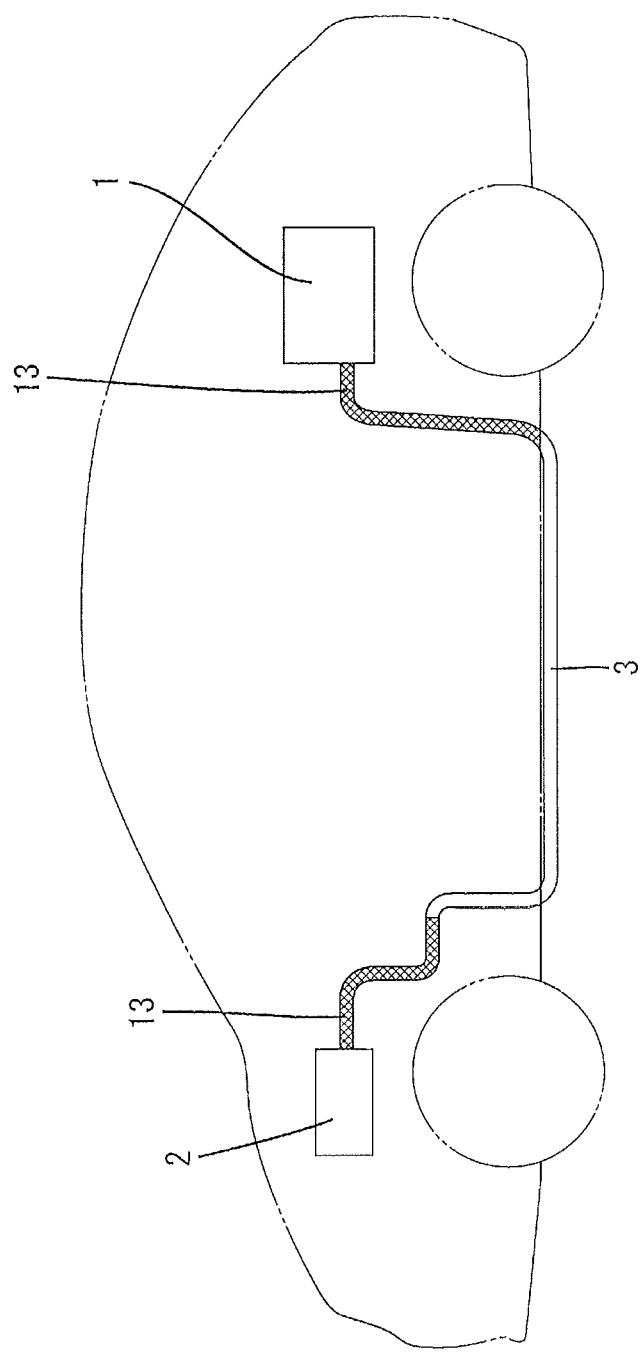
FIG. 1 is a schematic diagram illustrating a state in which a conductive cable is wired in a hybrid vehicle.

As shown in FIGS. 1 and 4, the rear end portion of the metal braided portion 13 may be connected to the front end portion of the shield pipe 3 by crimping a metal crimp ring 19 around them. The metal braided portion 13 is made up of individual conductive metal wires braided into, for example, a tubular shape, and has a favorable bendability. The connector 11 attached to the front end of each stranded electric cable 5 is integrated into a shield shell (not shown). The front end of the metal braided portion 13 is connected to this shield shell. Therefore, by inserting the conductive cables L into the shield pipe 3 and the metal braided portion 13, the conductive cables L are maintained in the shielded state over the entire wiring path.

Furthermore, as shown in FIG. 4, the portion of the metal braided portion 13 extending frontward from a connection portion where the metal braided portion 13 is connected to the shield pipe 3 may be inserted into and protected by a corrugated tube 14. The corrugated tube 14 may be made of, for example, a synthetic resin, may be formed into, for example, a bellows shape in which ridge portions and valley portions are repeated, and may have a favorable flexibility.

The portion where the corrugated tube 14 is connected to the shield pipe 3 may be covered with a sealing grommet 15. The grommet 15 may be made of, for example, a rubber material, and both of its end portions formed into, for example, a tubular shape. The tubular portion formed on one end (rear end) can be fitted to the outer circumferential portion of the shield pipe 3, and the tubular portion on the other end (front end) can be fitted to the outer circumferential portion of the corrugated tube 14. On the inner circumferential surface of the tubular portion on the rear end, a plurality of rows of seal lips 16 that can come into intimate contact with the outer circumferential surface of the shield pipe 3 may be formed along the entire circumference. In addition, on the inner circumferential surface of the tubular portion on the front end, a plurality of rows of sealing edges 17 that can enter the valley portions of the corrugated tube 14 and come into intimate contact with the bottom surfaces of the valley portions may be formed along the entire circumference. Furthermore, the outer circumferential surfaces of the two tubular portions can be fastened by bundling bands 18, and thus the shield pipe 3 and the corrugated tube 14 are connected to the grommet 15.

Next, the operation and effect of Embodiment 1 configured as described above will be described. As described above, the wiring section for the wire harness WH (conductive cables L) in Embodiment 1 can be separated into approximately two sections. The first section is a section in which the shield pipe 3 is disposed, and is a section in which the range of the linear wiring is long and the bending extent is small even in bending regions. In contrast, the second section is a section in the engine room in which the metal braided portion 13 is disposed, and is a section in which the bending extent is large.

In this embodiment, the single-core electric cables 4, which have a relatively low bendability, are disposed inside the shield pipe 3 serving as the first section. As described above, the first section has a long linear section and its bending extent is small even in bending sections. Therefore, excessive bending stress is not generated even if the single-core electric cables 4 are used in the first section. Furthermore, comparing the single-core electric cable 4 with the stranded electric cable 5, if the cross-sectional area of the conductor portion is the same as the total cross-sectional area of all individual wires, the outer diameter of the single-core electric cable 4 is smaller than the outer diameter of the stranded electric cable 5. Accordingly, the outer diameter of the shield pipe 3, which accommodates these single-core electric cables, can be reduced, and therefore, the space underneath the floor of the vehicle can be used more efficiently. Moreover, the single-core electric cables 4, which are inexpensive compared with the stranded electric cables 5, can be used for the greater part of the range in which the conductive cables L are wired, thus contributing to the reduction of the overall cost of the conductive cables L.

The second section is a section, inside a narrow engine room, in which the front end portion of the shield pipe 3 and the inverter 2 are connected to each other. Therefore, by wiring the stranded electric cables 5 having a superior bendability in this section, it becomes easy to handle the wiring of the electric cables, which is favorable for the connection task.

In Embodiment 1, the connection portion where the single-core electric cable 4 is connected to the stranded electric cable 5 is covered with the heat-shrinkable tube or hot melt 12, which connects the coating 7 and the coating 10. Accordingly, not only the insulation between the conductive cables L is ensured but also the water-stop properties can be ensured in the connection portions.

Furthermore, in Embodiment 1, the conductor 6 exposed from the single-core electric cable 4 is crushed into a flat plate shape to form the crushed portion 8, and therefore, it is possible to stably place the wires 9 of the stranded electric cable 5 on the surface of the crushed portion 8, thus making it possible to stabilize the joining state.

Moreover, in Embodiment 1, the connection portion where the conductor 6 of the single-core electric cable 4 is connected to the wires 9 of the stranded electric cable 5 is accommodated inside the shield pipe 3, and therefore, it is possible to avoid the case where bending stress is directly applied to the connection portion where the conductor 6 is connected to the wires 9 even when the metal braided portion 13 is bent at the end of the shield pipe 3.

Embodiment 2

Figure 5:
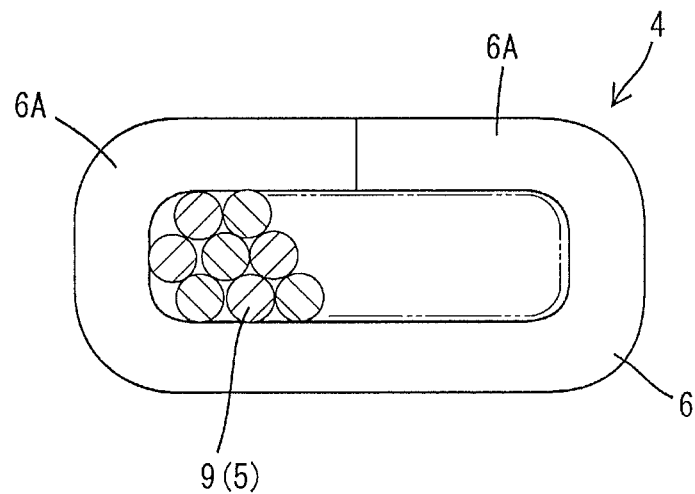
FIG. 5 is a cross-sectional view illustrating a state in which a conductor of the single-core electric cable and a core wire of the stranded electric cable are connected to each other by crimping in a conductive cable according to Embodiment 2.

FIG. 5 illustrates Embodiment 2 of the present disclosure. In Embodiment 1, a method was shown in which the conductor 6 exposed at the front end portion of the single-core electric cable 4 and the wires 9 exposed at the rear end portion of the stranded electric cable 5 are joined and connected to each other by ultrasonic welding, whereas they are connected to each other by crimping in Embodiment 2. That is, the conductor 6 portion exposed from the single-core electric cable 4 is crushed to be sufficiently expanded in the width direction, thus forming a pair of crimp portions 6A. The wire 9 portion of the stranded electric cable 5 is placed on the crushed portion 8, which has been formed in this manner, and the two side portions in the width direction are bent toward the inside and are crimped. The single-core electric cable 4 and the stranded electric cable 5 can also be connected to each other by such a method.

The other configurations are the same as those of Example 1, and therefore, the same operation and effect can be exhibited.

Embodiment 3

Figure 6:
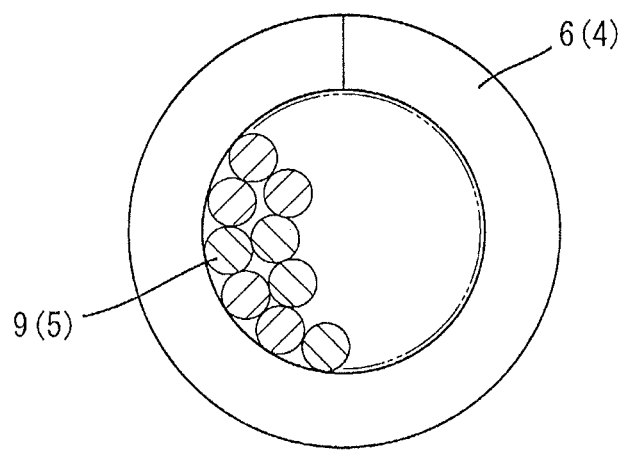
FIG. 6 is a cross-sectional view illustrating a state in which a conductor of the single-core electric cable and a core wire of the stranded electric cable are connected to each other by crimping in a conductive cable according to Embodiment 3.

FIG. 6 illustrates Embodiment 3 of the present disclosure. The conductor 6 was crimped on the wires 9 so as to have a rectangular cross section in Embodiment 2, whereas the conductor 6 is crimped on the wires 9 so as to have a circular cross section in Embodiment 3.

The other configurations are the same as those of Examples 1 and 2, and therefore, the same operation and effect can be exhibited.

Embodiment 4

A conductive cable according to Embodiment 4, in which the present disclosure is embodied, will be described with reference to FIG. 7.

A conductive cable L of this embodiment is different from that of Embodiment 1 in that the single-core electric cable 4 and the stranded electric cable 5 are electrically connected to each other by abutting an end surface 6E of the conductor 6 against end surfaces 9E of the wires 9 and welding them together. It should be noted that similar configurations to those in Embodiment 1 are denoted by the same reference numerals as in Embodiment 1, and redundant descriptions are omitted.

As in Embodiment 1, the conductive cable L of this embodiment may be constituted by the single-core electric cable 4 constituted by the single conductor 6 covered with the coating 7, and the stranded electric cable 5 constituted by the core wires obtained by stranding a plurality of wires 9 and covered with the coating 10, and the stranded electric cable 5 is electrically connected to at least one end portion of the two end portions in the length direction of the single-core electric cable 4.

Figure 7A:
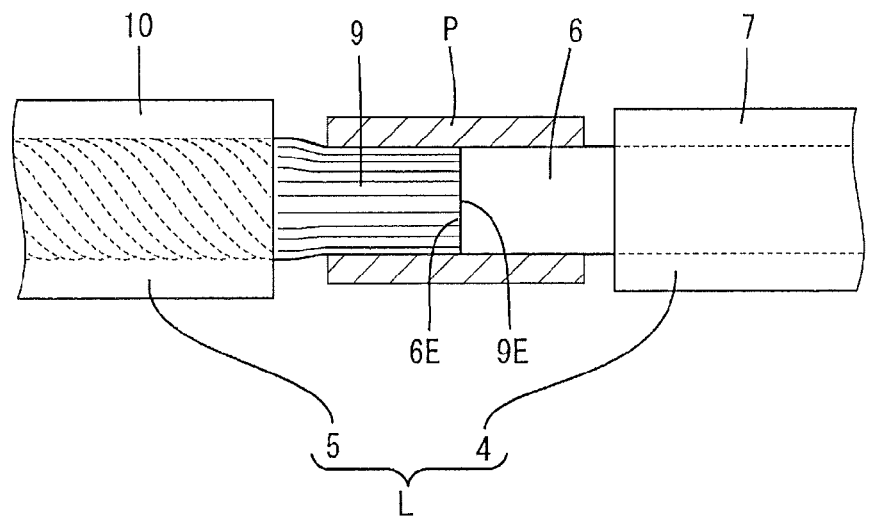
FIG. 7(A) is a cross-sectional view illustrating a state in which the conductor of the single-core electric cable and the core wires of the stranded electric cable are abutted against each other and welded.
Figure 7B:
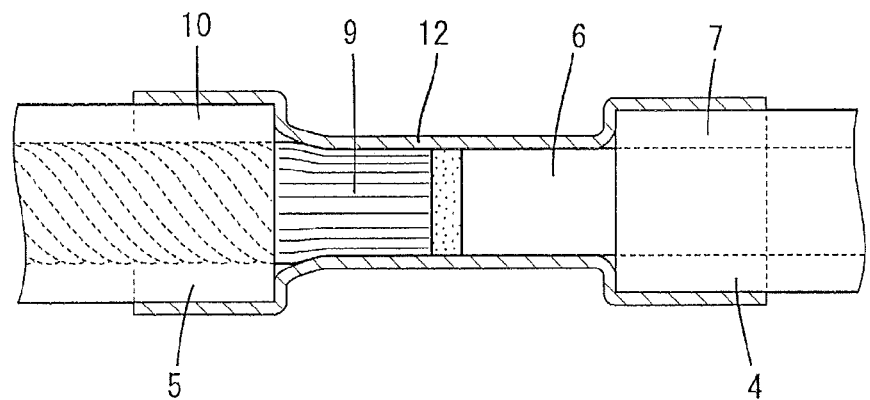
FIG. 7(B) is a cross-sectional view illustrating a state in which the connection portion where the single-core electric cable is connected to the stranded electric cable is covered with a heat-shrinkable tube or hot melt.

The single-core electric cable 4 and the stranded electric cable 5 may be joined to each other by butt welding, which is one type of resistance welding. In this connection task, as shown in FIG. 7(A), an end portion of the conductor 6 of the single-core electric cable 4 and end portions of the wires 9 of the stranded electric cable 5 are inserted into a pipe P made of, for example, ceramic, glass or the like, and the end surfaces 6E and 9E are abutted against each other. It is possible to prevent the wires 9 from coming loose by inserting the end portions of the wires 9 into the pipe P in this manner. An electric current is applied to the contact portion where the conductor 6 of the single-core electric cable 4 is connected to the wires 9 of the stranded electric cable 5, and the conductor 6 and the wires 9 are strongly pressed against each other in an axis direction such that the abutted end surfaces 6E and 9E do not separate from each other, and thus are welded together. After welding, the pipe P is broken and removed, and as in Embodiment 1, the connection portion where the single-core electric cable 4 is connected to the stranded electric cable 5 is covered with the heat-shrinkable tube or hot melt 12 (see FIG. 7(B)). The operation to connect the single-core electric cable 4 and the stranded electric cable 5 is completed in this manner.

As described above, since the single-core electric cable 4 and the stranded electric cable 5 are electrically connected to each other by abutting the end surface 6E of the conductor 6 against the end surfaces 9E of the wires 9 and welding them in this embodiment, it is possible to reduce the width dimension of the connection portion compared with the case where the conductor 6 of the single-core electric cable 4 and the wires 9 of the stranded electric cable 5 are stacked in the width direction and are connected to each other.

Other Embodiments

The present disclosure is not limited to the embodiments, which have been described using the foregoing description and the drawings, and, for example, embodiments as described below are also encompassed within the technical scope of the present disclosure.

(1) Although the conductive cables L were inserted into the shield members (shield pipe 3 and metal braided portion 13) in the foregoing embodiments, it goes without saying that the conductive cables L can be used alone without providing a shield means.

(2) Although the conductor 6 of the single-core electric cable 4 and the core wires of the stranded electric cable 5 were welded together by ultrasonic welding in the foregoing embodiments, resistance welding, soldering or the like may be performed instead of ultrasonic welding.

(3) Although the shield pipe 3 was made of metal and the metal braided portion 13 was formed by braiding individual metal wires in the foregoing embodiments, there is no limitation to this, and the shield pipe may be a conductive resin pipe other than a metal pipe and the conductive cables may be covered with metal foil or metal foil provided with slits instead of the metal braided portion 13.

(4) Although the conductor 6 of the single-core electric cable 4 and the wires 9 of the stranded electric cable 5 were made of copper or a copper alloy in the foregoing embodiments, they may be made of aluminum or an aluminum alloy. The single-core electric cable 4 side may be made of copper and a copper alloy, and the stranded electric cable 5 side may be made of aluminum or an aluminum alloy. Furthermore, the inverse combinations may also be used.

(5) Although three single-core electric cables 4 were collectively accommodated inside one shield pipe 3 in the foregoing embodiments, they may also be respectively accommodated inside three shield pipes 3.

(6) Although the heat-shrinkable tube or hot melt 12 was given as an example of a sealing member in the foregoing embodiments, molding, taping or the like may also be performed instead of using this. The term "sealing member" of the present disclosure also encompasses these means.

The invention claimed is:

1. A conductive cable comprising:
a single-core electric cable constituted by a single conductor covered with a first coating; and
a stranded electric cable constituted by a plurality of stranded wires that are covered with a second coating,
wherein the stranded electric cable is electrically connected to at least one of two end portions in a length direction of the single-core electric cable,
the first coating is stripped and the conductor is exposed at the at least one end portion of the single-core electric cable, the exposed conductor being crushed to one side in a thickness direction into a flat plate shape to form a crushed portion with first upper and lower surfaces in the thickness direction, and the wires of the stranded electric cable being connected to the first upper surface of the crushed portion, the first upper surface being disposed closer than the first lower surface to a center of the single conductor, and
the second coating covering the stranded electric cable is stripped and the stranded electric cable is exposed, the exposed stranded electric cable is connected to the first upper surface of the crushed portion, and the exposed stranded electric cable has a second upper surface and a second lower surface that is connected to the first upper surface of the crushed portion, the second lower surface of the exposed stranded electric cable being disposed closer than the second upper surface of the exposed stranded electric cable to a center of the stranded electric cable so that the second lower surface of the exposed stranded electric cable mates with the first upper surface of the crushed portion.

2. The conductive cable according to claim 1, wherein a connection portion where the single-core electric cable and the stranded electric cable are connected to each other is covered with a seal member.

3. The conductive cable according to claim 2, wherein the seal member is a heat-shrinkable tube that connects the first coating of the single-core electric cable with the second coating of the stranded electric cable while covering the connection portion.

4. A wiring structure for the conductive cable according to claim 1, comprising:
a shield pipe that is to be disposed underneath a floor of a hybrid vehicle or an electric vehicle and into which the single-core electric cable is inserted,
wherein the stranded electric cable is electrically connected to the single-core electric cable in a state in which at least a portion of the stranded electric cable projects from the shield pipe.

5. The conductive cable according to claim 1, wherein the crushed portion has the flat plate shape on the first upper and lower surfaces of the crushed portion.

6. The conductive cable according to claim 1, wherein the exposed conductor has the crushed portion and a neck portion that is not crushed, and the crushed portion is wider than the neck portion as viewed along the thickness direction.

7. A method for producing a conductive cable including a single-core electric cable constituted by a single conductor covered with a first coating, and a stranded electric cable constituted by a plurality of stranded wires that are covered with a second coating, the method comprising:
stripping the first coating from the conductor at an end portion of the single-core electric cable;
stripping the second coating from the wires at an end portion of the stranded electric cable;
crushing the exposed conductor to one side in a thickness direction into a flat plate shape to form a crushed portion with first upper and lower surfaces in the thickness direction, the first upper surface being disposed closer than the first lower surface to a center of the single conductor;
stacking the exposed wires on the first upper surface of the crushed portion, the exposed stranded electric cable having a second upper surface and a second lower surface that is connected to the first upper surface of the crushed portion, the second lower surface of the exposed stranded electric cable being disposed closer than the second upper surface of the exposed stranded electric cable to a center of the stranded electric cable so that the second lower surface of the exposed stranded electric cable mates with the first upper surface of the crushed portion; and
electrically connecting the wires to the crushed portion.

8. The method according to claim 7, wherein the electrically connecting of the wires to the crushed portion includes welding the wires to the crushed portion.

9. The method according to claim 7, wherein the electrically connecting of the wires to the crushed portion includes bending side portions of the crushed portion around the wires and crimping the side portions.

10. The method according to claim 9, wherein the side portions of the crushed portion are crimped to form a rectangular cross-section.

11. The method according to claim 9, wherein the side portions of the crushed portion are crimped to form a circular cross-section.

* * * * *